(12) United States Patent
Plestid et al.

(10) Patent No.: US 7,937,073 B2
(45) Date of Patent: *May 3, 2011

(54) DATA SESSION AUTHENTICATION CREDENTIALS UPDATE FOR A WIRELESS COMMUNICATION DEVICE

(75) Inventors: Thomas Leonard Trevor Plestid, Ottawa (CA); Allan D. Lewis, New Dundee (CA); Ian M. Patterson, Petersburg (CA)

(73) Assignee: Research In Motion Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 12/627,753

(22) Filed: Nov. 30, 2009

(65) Prior Publication Data

US 2010/0122325 A1    May 13, 2010

Related U.S. Application Data

(63) Continuation of application No. 11/213,571, filed on Aug. 26, 2005, now Pat. No. 7,634,253.

(51) Int. Cl.
*H04M 1/66* (2006.01)

(52) U.S. Cl. ........ 455/411; 455/436; 455/439; 455/442; 455/451; 455/452.1; 455/453; 370/395.41; 370/230; 370/231; 370/235; 370/278; 370/262; 370/329; 370/360; 370/395.2; 379/15.01; 379/91.02

(58) Field of Classification Search .................. 455/411, 455/410, 436, 445, 452.1, 453; 370/395.41, 370/230, 231, 235, 278, 282, 289, 360, 395.2; 379/15.01, 91.02

See application file for complete search history.

(56) References Cited

U.S. PATENT DOCUMENTS

| | | | | |
|---|---|---|---|---|
| 2004/0184613 A1* | 9/2004 | Lai et al. | ........................ | 380/249 |
| 2004/0205233 A1* | 10/2004 | Dunk | ............................ | 709/238 |

* cited by examiner

*Primary Examiner* — Nghi H Ly
*Assistant Examiner* — Nimesh Patel
(74) *Attorney, Agent, or Firm* — John J. Oskorep, Esq.

(57) ABSTRACT

Methods and apparatus of a wireless portable communication device for maintaining appropriate authentication credentials for accessing a data application maintained in a service network are provided. A default access point name (APN) or network access identifier (NAI) is maintained in memory of the wireless device. The wireless device submits, via a default wireless network, the default APN or NAI for establishing a data session in the default wireless network. The wireless device is then able to receive, in the data session via the default wireless network, a message service using the common data application maintained in the service network. In response to a change in service subscription for the wireless device, the wireless device receives, via a current cellular network, a current APN or NAI and stores it in its memory. The wireless device then submits, via the current wireless network, the current APN or NAI for establishing a data session in the current wireless network. The wireless device is then able to receive, in the data session via the current wireless network, the message service using the common data application maintained in the service network.

14 Claims, 4 Drawing Sheets

DATA SESSION AUTHENTICATION CREDENTIALS UPDATE FOR A WIRELESS COMMUNICATION DEVICE

CROSS-REFERENCE TO RELATED APPLICATION

The present application is a continuation of and claims priority to U.S. non-provisional patent application having application Ser. No. 11/213,571 and filing date of 26 Aug. 2005, now U.S. Pat. No. 7,634,253 B2, which is hereby incorporated by reference herein.

FIELD OF THE INVENTION

The present invention generally relates to data service portability between wireless operators for a wireless communication device, and more specifically to dynamically updating data session authentication credentials of the wireless communication device as applicable to various wireless operators.

BACKGROUND OF THE INVENTION

In a typical wireless portable communication device, a common data application using a common data service available across multiple wireless operator's networks, such as BlackBerry™, instant messaging ("IM"), multimedia messaging service ("MMS"), and/or push-to-talk over cellular ("PoC") available on
Internet and/or a private network, is loaded at the manufacturer. Such wireless portable communication devices are shipped to multiple wireless service operators who require the use of different data authentication credentials for the common data application. For example, in a Code-Division Multiple Access ("CDMA") 2000 1x Radio Transmission Technology ("1xRTT") network, where 1x refers to a single radio channel, for a third generation ("3G") mobile system, a network access identifier ("NAI") is used for a point-to-point protocol ("PPP"), and in a General Packet Radio Service ("GPRS"), an access point name ("APN") is used for a packet data protocol ("PDP") contexts.

For a particular wireless service operator, a specific data authentication is generally hard-coded into the wireless portable communications devices allocated for the particular wireless service operator as an operator customization. This method is the accepted practice in the industry, as it is highly desirable from a user's perspective, and obviates any need for the user to maintain knowledge of data authentication credentials. For example, an APN specifying a wireless bearer path for e-mail over one wireless service operator would be different from an APN for e-mail over another wireless service operator regardless of the fact that these wireless service operators may use the same server on the Internet. With local number portability laws in certain jurisdictions, such as those in the United States and European Union, subscribers are now allowed to switch wireless carriers while retaining the same telephone numbers in some circumstances. Generally, the local number portability relates to subscriber identification module("SIM") lock for Global System for Mobile communications ("GSM") and GPRS networks, or Mobile Directory Number ("MDN") access as compared to International Mobile Subscriber Identity ("IMSI") in CDMA networks. However, with the prevalence of data centric wireless portable communication devices, some subscribers may wish not only to retain the current telephone numbers with a new wireless service provider, but also to continue using the same wireless portable communication devices and its data applications with the new wireless communication service provider.

DETAILED DESCRIPTION OF THE PREFERRED EMBODIMENTS

A wireless portable communication device receives an up-to-date authentication credentials required for a common data application in a wireless communication network in which the wireless portable communication device is currently registered. The up-to-date authentication credentials may include a list of a plurality of wireless communication networks mapped against the up-to-date authentication credentials. The wireless portable communication device may receive the up-to-date authentication credentials periodically at a predetermined interval, based upon a predetermined condition, or by requesting the up-to-date authentication credentials. The up-to-date authentication credentials are then prioritized over existing authentication credentials, and are used for the common data application in the wireless communication network in which the wireless portable communication device is currently registered. The wireless communication network, which requires authentication credentials for the common data application, keeps the required authentication credentials up to date, and transmits the up-to-date authorization credentials periodically at a predetermined interval, based upon a predetermined condition, or in response to receiving a request for the up-to-date authentication credentials. The wireless communication network allows the wireless portable communication device having the up-to-date authentication credentials a use of the common data application.

Figure 1:
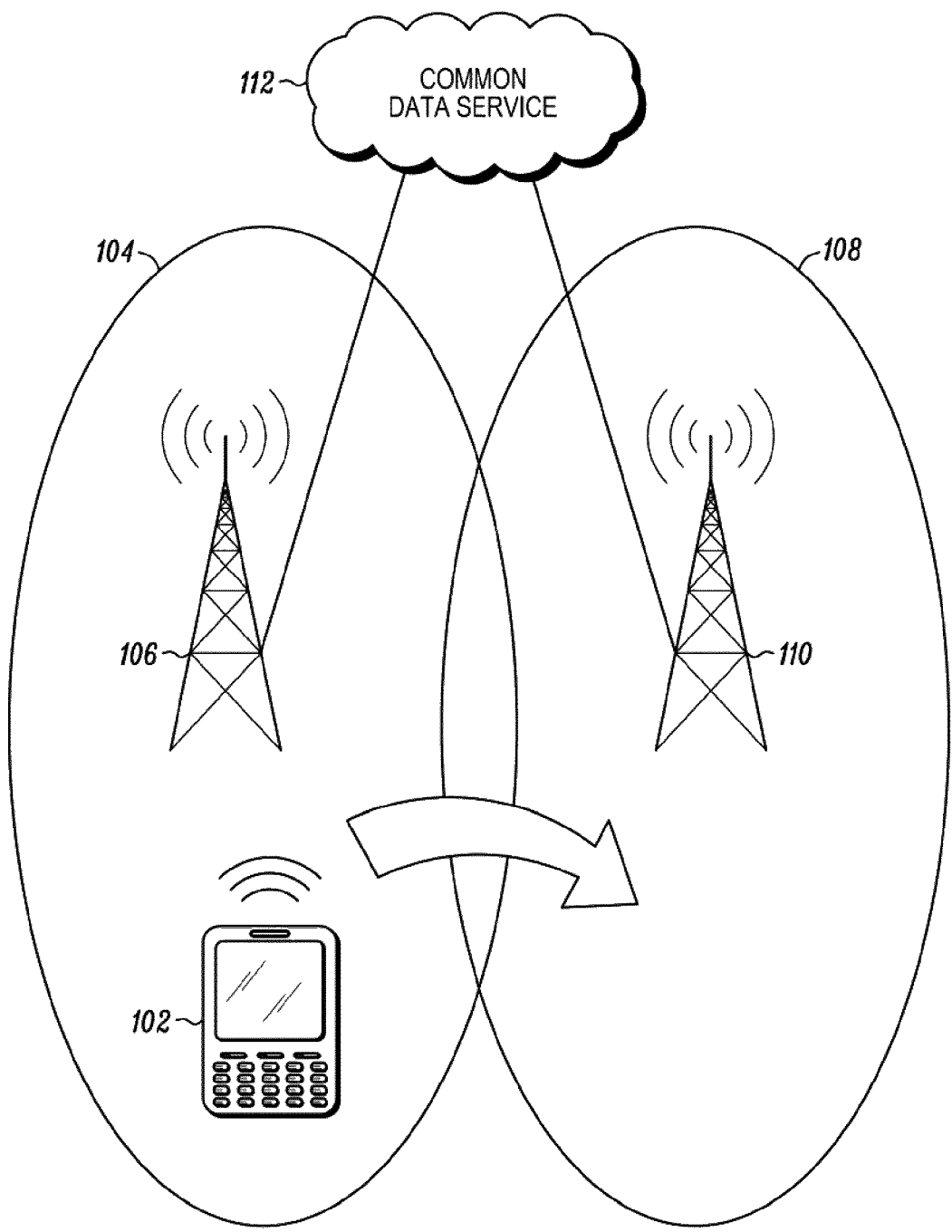
FIG. 1 is an exemplary environment in which a wireless portable communication device in accordance with at least one of the preferred embodiments may be practiced.

FIG. 1 is an exemplary environment 100 in which a wireless portable communication device 102 in accordance with at least one of the preferred embodiments may be practiced. The wireless portable communication device 102 is presently shown to be located in a first coverage area 104 supported by a first wireless communication network 106, which is adjacent to a second coverage area 108 supported by a second wireless communication network 110. The wireless portable communication device 102 has default authentication credentials for a common data application such as an e-mail application, which is maintained in a common service 112, accessed through the first wireless communication network 106. While the wireless portable communication device 102 is within the first coverage area 104 and is registered to the first wireless communication network 106, the wireless portable communication device 102, having the default authentication credentials fully compatible with the first wireless communication network 106, properly accesses the common data application. However, as the wireless portable communication device 102 moves from the first coverage area 104 to the second coverage area 108 and re-registers to the second wireless communication network 110, the default authentication credentials of the wireless portable communication device 102 may not be compatible to access the common data application in the second wireless communication network 110. For an exemplary case where the user is permanently changing his subscription to the operator of the wireless communication network 110, the wireless portable communication device 102 therefore needs to able to update the default authentication credentials to new authentication credentials that are compatible in the second wireless communication network 110 before being able to properly access the common data application. Further, the first wireless communication network 106 may change the default authentication credentials from time to time, and may cause the wireless portable communication device 102 to fail to access the common data application properly. Therefore, the wireless portable communication device 102 needs to be able to maintain up-to-date authentication credentials.

Figure 2:
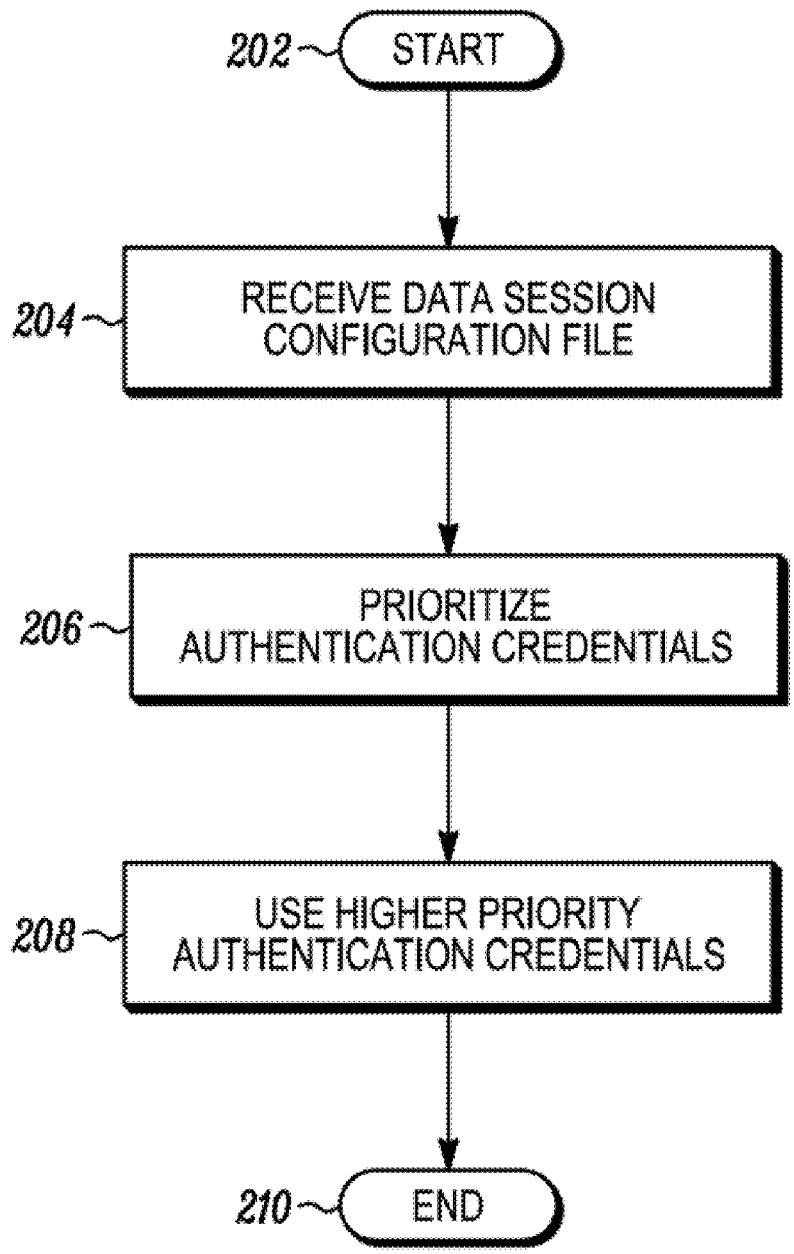
FIG. 2 is an exemplary flowchart illustrating a process in the wireless portable communication device for maintaining up-to-date authorization credentials for accessing the common data application in accordance with at least one of the preferred embodiments.

FIG. 2 is an exemplary flowchart 200 illustrating a process in the wireless portable communication device 102 for maintaining up-to-date authorization credentials for accessing the common data application in accordance with at least one of the preferred embodiments. The wireless portable communication device 102 has default authentication credentials required for the common data application in a default service network, which is the first wireless communication network 106. The process begins in block 202, and the wireless portable communication device 102 receives a data session configuration file, which includes authentication credentials in block 204. The wireless portable communication device 102 may typically receive the data session configuration file wirelessly from the current wireless communication network, but it may alternatively receive the data session configuration file by downloading from the internet. The data session configuration file may further include a list of a plurality of service networks mapped against the received authentication credentials for use with the common data application. This plurality applies as the user subscriptions to a plurality of wireless network operators change. The wireless portable communication device 102 may receive the data session configuration file based upon various conditions. The wireless portable communication device 102 may transmit a request to receive the data session configuration file, or may receive the data session configuration file based upon a predetermined condition. For example, the wireless portable communication device 102 may receive the data session configuration file upon registering to the current service network using a common registration channel, upon failing to properly access the common data application in the current service network, or upon roaming from the default service network to the current service network. The wireless portable communication device 102 may also autonomously receive the data session configuration file periodically.

The wireless portable communication device 102 may further determine the compatibility associated with the wireless portable communication device 102, a subscriber identity module in the wireless portable communication device 102, and the current wireless communication network, and may receive the data session configuration file based upon the compatibility. The subscriber identity module may be one of a Subscriber Identity Module ("SIM") used in networks based upon Global System for Mobile Communications ("GSM"), a Removable User Identification Module ("R-UIM") used in networks based upon Code Division Multiple Access ("CDMA"), or any other similar subscriber identification module.

In block 206, the wireless portable communication device 102 prioritizes the authentication credentials between the default authentication credentials and the received authentication credentials. For example, as previously shown in FIG. 1, when the wireless portable communication device 102 receives new authentication credentials as a result of moving from the first wireless communication network 106 to the second wireless communication network 110 requiring the new authorization credentials to access the common data application, the new received authorization credentials are prioritized over the default authorization credentials. Once prioritized, the default authentication credentials may be overwritten with the received authentication credentials, making the received authentication credentials as new default authentication credentials. Alternatively, both the default authentication credentials and the received authentication credentials are stored in the wireless portable communication device 102, and may be available for later usage. In block 208, the wireless portable communication device 102 uses the authentication credentials having higher priority for the common data application in the current service network. The authorization credentials may be re-prioritized when the wireless portable communication device 102 moves back to the first wireless communication network 106. The process then ends in block 210.

Figure 3:
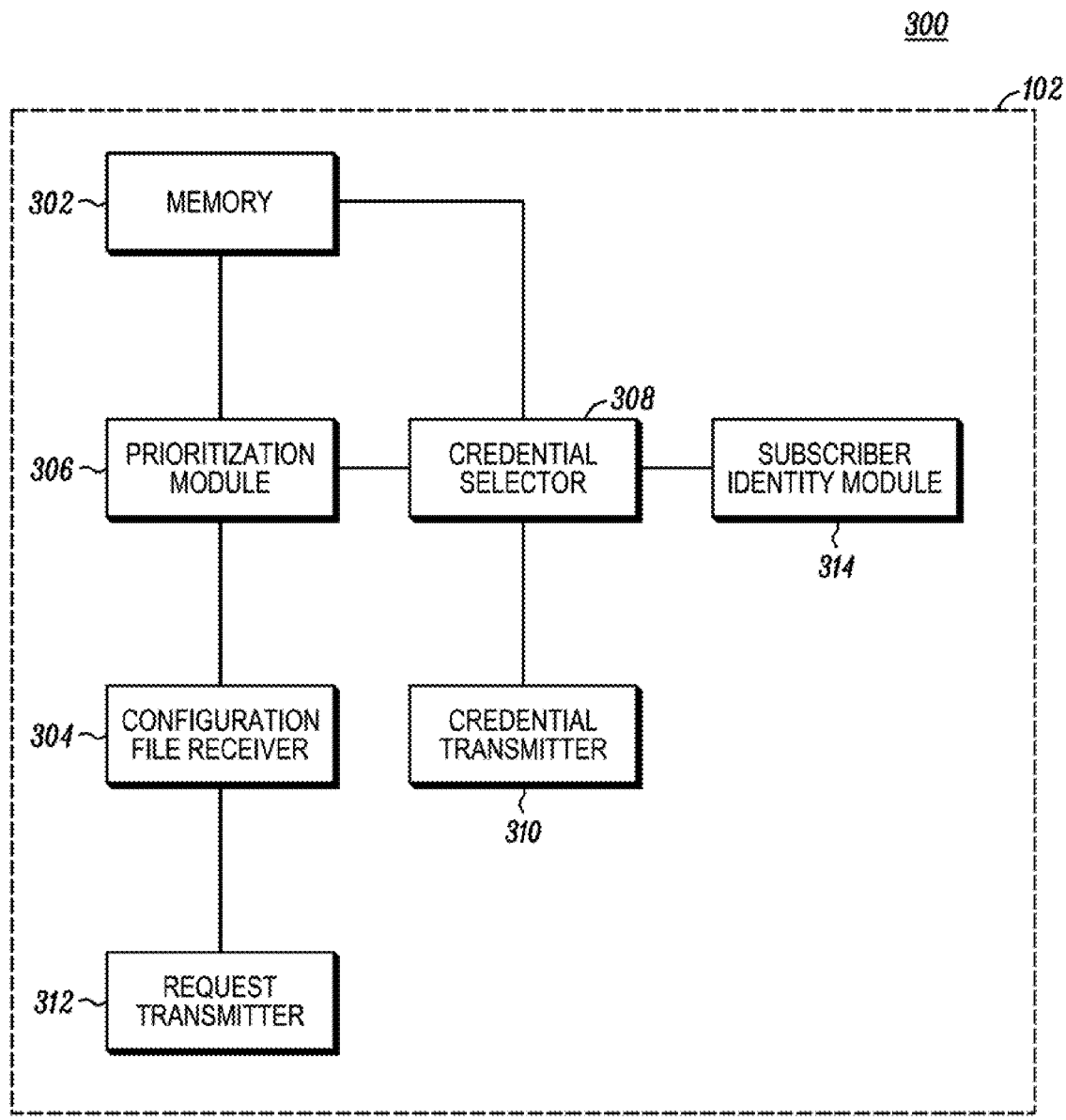
FIG. 3 is an exemplary block diagram of the wireless portable communication device configured to maintain appropriate authentication credentials required for the common data application in the current service network in accordance with at least one of the preferred embodiments.

FIG. 3 is an exemplary block diagram 300 of the wireless portable communication device 102 configured to maintain appropriate authentication credentials required for the common data application in the current service network in accordance with at least one of the preferred embodiments. A battery, a display, a keypad, a speaker, a microphone, an antenna, and other normally associated components are understood to be present but are not specifically shown with the wireless portable communication device 102 for simplicity. The wireless portable communication device 102 has in memory 302 default authentication credentials, which are required for the common data application in a default service network, such as the first wireless communication network 104. The wireless portable communication device 102 has a configuration file receiver 304, which is configured to receive a data session configuration file. The data session configuration file includes authentication credentials, and may further include a list of a plurality of service network mapped against the received authentication credentials for use with the common data application. A prioritization module 306 is coupled to the configuration file receiver 304 and to the memory 302, and is configured to prioritize between the default authentication credentials and the received authentication credentials. A credential selector 308 is coupled to the prioritization module 306, and is configured to select the authentication credentials having higher priority for the common data application in the current service provider. A credential transmitter 310 is coupled to the credential selector 308, and is configured to transmit the selected authorization credentials for the common data application in the current service network. The wireless portable communication device 102 may further have a request transmitter 312, which is coupled to the configuration file receiver 304 and is configured to transmit a request to receive the data session configuration file. The memory 302 may be further coupled to the credential selector 308, and be further configured to be overwritten with the authentication credentials selected by the credential selector 308. The memory 302 may comprise volatile and non-volatile memory modules, having the default authentication credentials programmed in the non-volatile memory module and having the received authentication credentials in the volatile memory module.

The wireless portable communication device 102, specifically the configuration file receiver 304, may be further configured to receive the data session configuration file based upon various predetermined conditions. For example, the configuration file receiver 304 may be configured to receive the data session configuration file upon registration of the wireless portable communication device 102 to the current service provider using a common registration channel, upon failure of the wireless portable communication device 102 to properly access the common data application in the current service provider, or upon the wireless portable communication device 102 roaming from the default service network to the current service network. The configuration file receiver 304 may be further configured to autonomously receive the data session configuration periodically. Further, the bearer path may be entirely independent from the wireless network for receipt of the configuration file, for example, it may be downloaded off of the internet to the wireless portable communication device 102.

The wireless portable communication device 102 may further comprise a subscriber identity module 314 such as a Subscriber Identity Module ("SIM") used in networks based upon Global System for Mobile Communications ("GSM") and a Removable User Identification Module ("R-UIM") used in networks based upon Code Division Multiple Access ("COMA") or via the service programming implemented directly on the wireless portable communication device 102 where no R-UIM is present. The subscriber identity module 314 is coupled to the credential selector 308, and is configured to provide information to the current service network, such as the first wireless communication network 106 regarding the identity of a subscriber and associated services. Although typically a wireless portable communication device and its subscriber identity module are associated with the same wireless communication network provider, because the subscriber identity module is fully or partially compatible with similar wireless portable communication devices, the subscriber identity module associated with one wireless communication service provider may be used with a wireless portable communication device associated with another wireless communication service provider. Further, as a result of roaming or user subscription changes to other operators, such a combination of the wireless portable communication device and the subscriber identity module may register and operate in yet another wireless communication service provider's network. The configuration file receiver 304 may further be configured receive the data session configuration file based upon the compatibility among the wireless portable communication device 102, the subscriber identity module 314, and the current wireless communication network.

Figure 4:
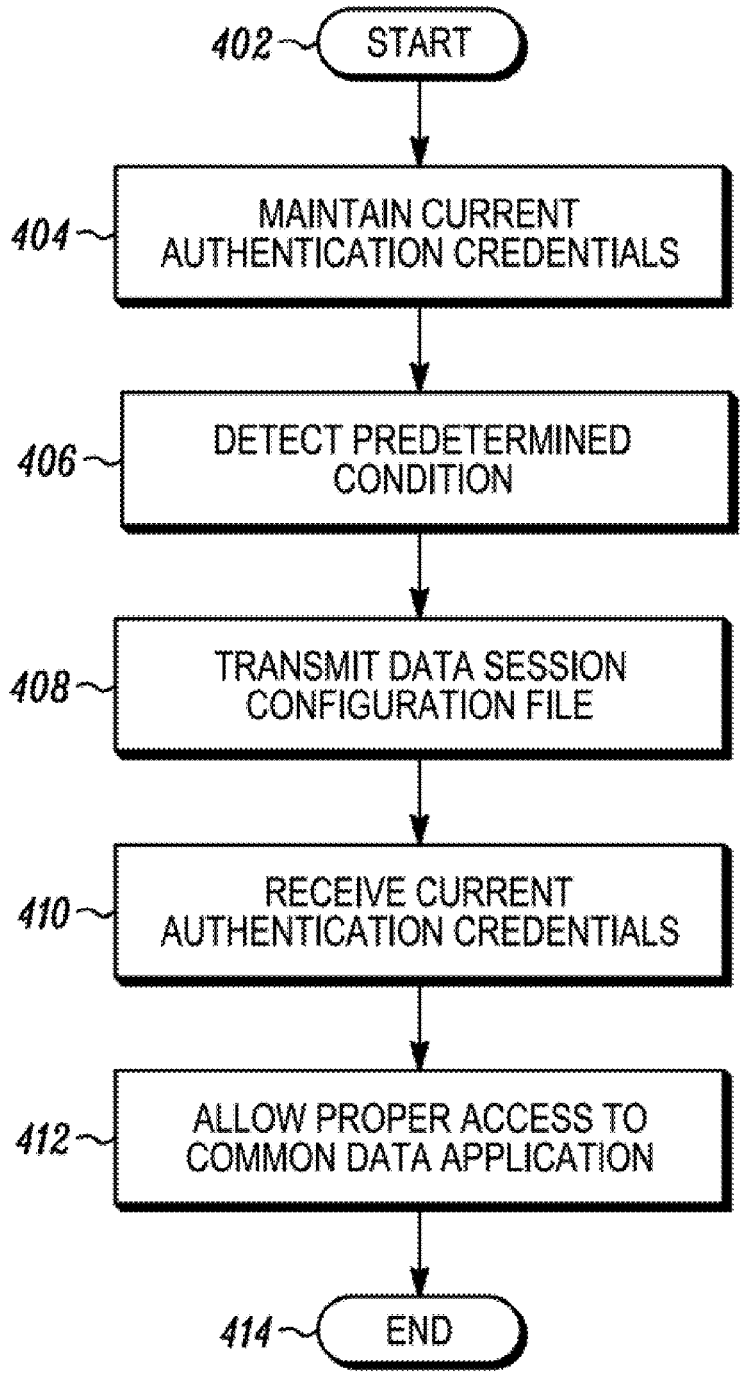
FIG. 4 is an exemplary flowchart illustrating a process in the wireless communication network for providing current authentication credentials required for the common data application accessible through the wireless communication network in accordance with at least one of the preferred embodiments.

FIG. 4 is an exemplary flowchart 400 illustrating a process in the wireless communication network 106 for providing current authentication credentials required for the common data application accessible through the wireless communication network 106 in accordance with at least one of the preferred embodiments. The first wireless communication network 106 is simply referred as the wireless communication network 106 for this illustration. The process begins in block 402, and the wireless communication network 106 maintains the current, or up-to-date, authentication credentials indicative of currently required authentication credentials for the common data application in block 404. The wireless communication network 106 may maintain the current authentication credentials in various ways including, but not limited to, acquiring the current authentication credentials by communicating with common data service 112 periodically, and receiving the current authentication credentials from the common data service 112 as they are updated. The wireless communication network 106 then detects a predetermined condition for transmitting a data session configuration file in block 406. Alternatively, the common data service 112 may detect the predetermined condition through the wireless communication network 106. The data session configuration file includes the current authentication credentials, and may further include a list of a plurality of wireless communication networks mapped against the appropriate authentication credentials for use with the common data application. The predetermined condition to be detected in block 406 for transmitting the data session configuration may be one of various predetermined conditions including, but not limited to, receiving a request for the data session configuration file, receiving a registration of a wireless portable communication device using a common registration channel, determining a registered wireless portable communication device failing to properly access the common data application, and reaching a predetermined periodic transmission time interval. As one of the predetermined conditions, the wireless communication network 106, or the common data service 112, may further determine the compatibility associated with a wireless portable communication device registered in the wireless communication network 106, such as the wireless portable communication device 102, a subscriber identity module in the wireless portable communication device 102, and the wireless communication network 106 itself. The subscriber identity module may be one of a Subscriber Identity Module ("SIM") used in networks based upon Global System for Mobile Communications ("GSM"), a Removable User Identification Module ("R-UIM") used in networks based upon Code Division Multiple Access ("CDMA"), or any other similar subscriber identification module.

Upon detecting one of the predetermined conditions in block 406, the wireless communication network 106, or the common data service 112, transmits the data session configuration file in block 408, generally only to the wireless portable communication device 102, which triggered the predetermined condition detection process. Alternatively, the wireless communication network 106, or the common data service 112, may broadcast the data session configuration file periodically to all wireless portable communication devices currently registered to the wireless communication network 106. Upon receiving the current authentication credentials from the wireless portable communication device 102 in block 410, the wireless communication network 106 allows the wireless portable communication device 102 proper access to the common data application in block 412. The process then terminates in block 414.

While the preferred embodiments of the invention have been illustrated and described, it is to be understood that the invention is not so limited. Numerous modifications, changes, variations, substitutions and equivalents will occur to those skilled in the art without departing from the spirit and scope of the present invention as defined by the appended claims.

What is claimed is:

1. A method in a wireless portable communication device for use in maintaining appropriate authentication credentials for accessing an electronic mail (e-mail) application for receiving e-mail messages via an e-mail message service provided in a service network, the method comprising the acts of:

maintaining, in memory, a default access point name (APN) or network access identifier (NAI);

submitting, via a default wireless network, the default APN or NAI for establishing a data session in the default wireless network;

receiving, in the data session established via the default wireless network, e-mail messages via the e-mail message service provided in the service network;

communicating via a current wireless network;

receiving, via the current wireless network, a current APN or NAI responsive to a chance in subscription for the wireless portable communication device from the default wireless network to the current wireless network;

storing, in the memory, the current APN or NAI received via the current wireless network;

submitting, via the current wireless network, the current APN or NAI for establishing a data session in the current wireless network; and receiving, in the data session established via the current wireless network, e-mail messages via the e-mail message service provided in the service network.

2. The method of claim 1, wherein the default wireless network comprises a default cellular network and the current wireless network comprises a current cellular network.

3. The method of claim 1, wherein the default APN or NAI comprises a default APN, and the data session comprises a Packet Data Protocol (PDP) context.

4. The method of claim 1, wherein the default APN or NAI comprises a default NAI, and the data session comprises a Point-to-Point Protocol (PPP) session.

5. The method of claim 1, further comprising:
    transmitting, via the current wireless network, a request for receiving a data session configuration file; and
    receiving, via the current wireless network, the data session configuration file having the current APN or NAI in response to transmitting the request.

6. The method of claim 1, further comprising:
    registering in the current wireless network; and
    receiving the current APN or NAI upon registration in the current wireless network.

7. The method of claim 1, further comprising:
    roaming from the default wireless network to the current wireless network; and
    receiving the current APN or NAI upon roaming from the default wireless network to the current wireless network.

8. A wireless portable communication device configured to maintain appropriate authentication credentials for accessing an electronic mail (e-mail) application for receiving e-mail messages via an e-mail message service provided in a service network, the wireless portable communication device comprising:

a memory configured to store a default access point name (APN) or network access identifier (NAI);

a transmitter configured to send, via a default wireless network, the default APN or NAI for establishing a data session in the default wireless network;

a receiver configured to receive e-mail messages, in the data session established via the default wireless network, using the e-mail message service provided in the service network;

the receiver being further configured to receive, via a current wireless network, a current APN or NAI responsive to a change in subscription for the wireless portable communication device from the default wireless network to the current wireless network;

the memory being further configured to store the current APN or NAI received via the current wireless network;

the transmitter being further configured to send, via the current wireless network, the current APN or NAI for establishing a data session in the current wireless network; and the receiver being further configured to receive e-mail messages, in the data session established via the current wireless network, using the e-mail message service provided in the service network.

9. The wireless portable communication device of claim 8, wherein the receiver and the transmitter are configured to operate with default and current wireless networks comprising cellular networks.

10. The wireless portable communication device of claim 8, wherein the default APN or NAI comprises a default APN, and the data session comprises a Packet Data Protocol (PDP) context.

11. The wireless portable communication device of claim 8, wherein the default APN or NAI comprises a default NAI, and the data session comprises a Point-to-Point Protocol (PPP) session.

12. The wireless portable communication device of claim 8, wherein the transmitter is further configured to transmit, via the current wireless network, a request for receiving a data session configuration file, and the receiver is further configured to receive, via the current wireless network, the data session configuration file having the current APN or NAI in response to transmitting the request.

13. The wireless portable communication device of claim 8, wherein the receiver is further configured to receive the current APN or NAI upon registration in the current wireless network.

14. The wireless portable communication device of claim 8, wherein the receiver is further configured to receive the current APN or NAI upon roaming from the default wireless network to the current wireless network.

\* \* \* \* \*